(No Model.)
R. RICHTER.
DRAWING APPARATUS.
No. 599,402.   Patented Feb. 22, 1898.
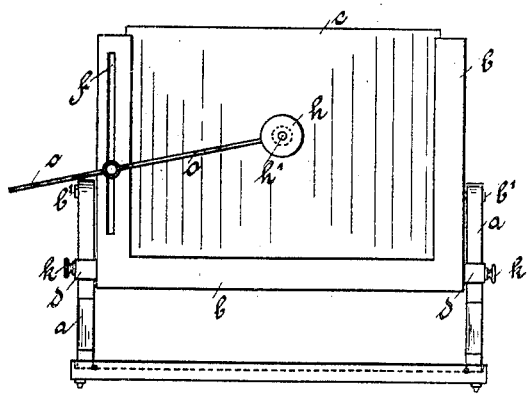
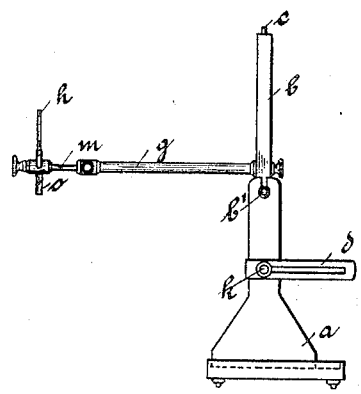
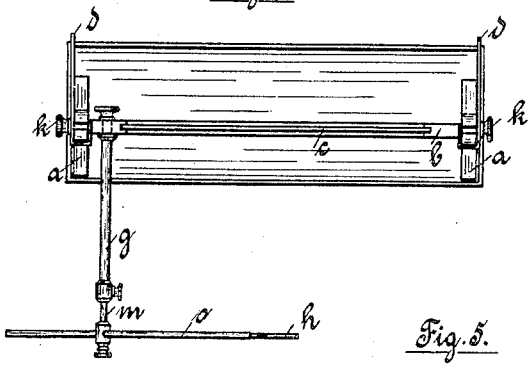
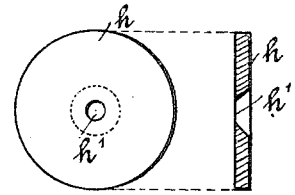
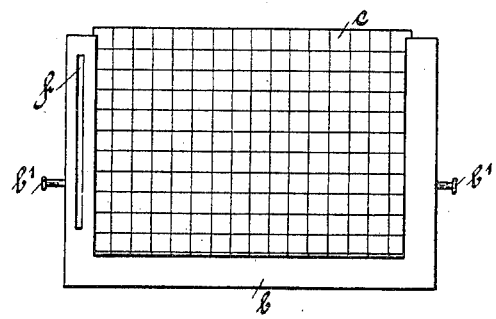
Witnesses:
Inventor:
Robert Richter
per Brede & Co.
Robert Brede
Attorney

UNITED STATES PATENT OFFICE.

ROBERT RICHTER, OF COLOGNE, GERMANY.

DRAWING APPARATUS.

SPECIFICATION forming part of Letters Patent No. 599,402, dated February 22, 1898.

Application filed December 26, 1896. Serial No. 617,126. (No model.)

*To all whom it may concern:*

Be it known that I, ROBERT RICHTER, a subject of the King of Prussia, German Emperor, and a resident of Cologne, in the Province of the Rhine, Kingdom of Prussia, German Empire, have invented a new and useful Drawing Apparatus, of which the following is an exact specification.

This invention relates to an improved drawing apparatus the purpose of which is to enable any person to sketch or copy objects of any kind while looking at them through a transparent table or plate from a fixed or stationary point of sight. The contours and lines of the objects regarded in this way are drawn after upon the table or plate, which of course is situated between the stationary point of sight and the objects to be copied. The condition of the table or plate must therefore be such that lines can be drawn upon it and that the objects to be copied can distinctly enough be seen through it.

In order to make my invention more clear, I refer to the accompanying drawings, in which similar letters denote similar parts throughout the different views, and in which—

Figure 1 is a front view of the apparatus. Fig. 2 is a side view of the same; Fig. 3, a plan. Fig. 4 shows the disk of sight $h$ in front view and in section, and Fig. 5 shows a modified form of the transparent table or plate.

The standards $a$, Figs. 1 to 3, support a frame $b$ by means of pivots $b'$, secured to said frame. The latter is grooved, so as to be able to receive a glass plate $c$. Slotted arms $d$, movably attached to the frame $b$, take around the standards $a$ and may be fixed in any desired position by means of screws $k$, held by said standards. Thus by displacing the arms $d$ upon the screws $k$ the frame $b$, with the glass plate $c$, may be adjusted in a manner corresponding to the position of the objects to be copied.

The left-hand leg of the U-shaped frame $b$ is provided with a slot $f$, through which passes one end of a piece of tube $g$, that may be adjusted in height within said slot $f$ and may be secured in any height to the frame $b$ or to the respective leg of the same, respectively. The tube $g$ contains a rod $m$, which may be displaced within said tube and may be fixed in any position. Another rod $o$, held by the front end of the rod $m$, may be displaced within the thickened head of said rod and may also be fixed in any position. That end of the rod $o$ which lies opposite to the glass plate $c$ carries the sight-disk $h$. The latter is provided with an aperture $h'$, Fig. 4, that widens in the direction to the plate $c$.

If an object—for instance, a landscape—shall be copied, the plate $c$ is first properly adjusted with aid of the arms $d$ and the screws $k$ in such a manner that the respective landscape appears in proper site upon the plate $c$ when regarded through the sight-disk $h$. The draftsman must lay his eye quite near to the sight-disk, when he must be able to see upon the plate $c$ the landscape desired, so that he can draw after the contours and lines of the same.

It is of importance that no displacement of the point of sight and no disturbance by by-rays can take place. These objects are attained by letting the front diameter of the aperture $h'$ be but very small and by letting said aperture widen in the direction to the glass plate, as aforedescribed.

It is further of importance that the front surface of the glass plate be rough enough to allow of the making of lines by a black or colored pencil without, however, impairing the transparency of the glass plate in such a degree that the draftsman be hindered from distinctly seeing everything he wishes to copy.

It is finally of importance that the sight-disk $h$ be adjustable with regard to its height, as well as to its distance from the plate $c$, and also to the right or left.

As to roughing the glass plate, this may be attained in a chemical way as well as in a mechanical one—for instance, by a suitable acid or gas or by a sand-blowing machine—and as to the means for adjusting the sight-disk these have been before described.

The glass plate $c$ may well be provided with squares, as shown in Fig. 5, which facilitates transferring the drawing on paper or the like.

Having thus fully described the nature of this invention, what I desire to secure by Letters Patent of the United States is—

In a drawing apparatus, the combination with a transparent plate allowing of drawing thereon with a pencil or the like, and with an adjustable frame holding said plate, of a horizontal tube $g$ extending rectangularly to said frame and being adapted to be adjusted in height within a vertical slot of the frame; a rod $m$ arranged displaceably within said tube $g$ and another bar $o$ held displaceably by an end of said rod $m$ and extending parallelly to the said transparent plate, and a sight-disk $h$ held by the rod $o$ opposite to the transparent plate, substantially and for the purpose as described.

In testimony whereof I have signed this specification in the presence of two subscribing witnesses.

ROBERT RICHTER.

Witnesses:
 THEODOR HEESE,
 EMIL THILL.